United States Patent
Matsuo et al.

(10) Patent No.: US 10,675,963 B2
(45) Date of Patent: Jun. 9, 2020

(54) CONTROL DEVICE FOR TRANSPORT VEHICLE

(71) Applicant: HONDA MOTOR CO., LTD., Tokyo (JP)

(72) Inventors: Yuhei Matsuo, Saitama (JP); Toshihide Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/912,721

(22) Filed: Mar. 6, 2018

(65) Prior Publication Data

US 2018/0264926 A1   Sep. 20, 2018

(30) Foreign Application Priority Data

Mar. 17, 2017   (JP) ................................. 2017-052172

(51) Int. Cl.
*B60K 6/445*   (2007.10)
*B60W 10/08*   (2006.01)
(Continued)

(52) U.S. Cl.
CPC .............. *B60K 6/445* (2013.01); *B60K 6/448* (2013.01); *B60K 6/52* (2013.01); *B60L 15/2018* (2013.01); *B60W 10/08* (2013.01); *B60W 30/1843* (2013.01); *B60W 30/18118* (2013.01); *B60L 2240/429* (2013.01); *B60L 2250/28* (2013.01); *B60W 2520/10* (2013.01); *B60W 2530/16* (2013.01); *B60W 2540/103* (2013.01); *B60W 2540/12* (2013.01); *B60W 2552/15* (2020.02);

(Continued)

(58) Field of Classification Search
CPC ..... B60K 6/445; B60W 10/08; B60L 2250/28
USPC ......................................................... 318/432
See application file for complete search history.

(56) References Cited

U.S. PATENT DOCUMENTS 8,935,026 B2 *   1/2015   Matsushita ............ B60K 6/448
                                                                  475/5
9,037,375 B2 *   5/2015   Tahara .................... B60T 7/042
                                                                  701/70

(Continued)

FOREIGN PATENT DOCUMENTS

JP   H09-135504 A     5/1997
JP   2001-320802 A    11/2001
(Continued)

OTHER PUBLICATIONS

Dec. 17, 2019, Japanese Office Action issued for related JP Application No. 2017-052172.

*Primary Examiner* — Kawing Chan
(74) *Attorney, Agent, or Firm* — Paratus Law Group, PLLC

(57) ABSTRACT

A control device for a transport vehicle configured to travel with a driving force output from an electric motor is provided. When the transport vehicle is driven by a driving force of the electric motor, the control device performs a driving force limit control to reduce the driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more.

16 Claims, 7 Drawing Sheets

(51) Int. Cl.
*B60W 30/18* (2012.01)
*B60L 15/20* (2006.01)
*B60W 30/184* (2012.01)
*B60K 6/52* (2007.10)
*B60K 6/448* (2007.10)

(52) U.S. Cl.
CPC ... *B60W 2552/40* (2020.02); *B60W 2710/083* (2013.01); *Y02T 10/6221* (2013.01); *Y02T 10/6239* (2013.01); *Y02T 10/6265* (2013.01); *Y02T 10/7077* (2013.01); *Y02T 10/7275* (2013.01)

(56) References Cited

U.S. PATENT DOCUMENTS

| | | | |
|---|---|---|---|
| 9,610,928 B2 * | 4/2017 | Kinoshita | B60T 7/042 |
| 9,641,116 B2 * | 5/2017 | Weiffen | H02P 27/06 |
| 2012/0150384 A1 * | 6/2012 | Jung | B60W 30/18063 |
| | | | 701/31.1 |
| 2013/0054062 A1 | 2/2013 | Matsushita | |
| 2014/0114553 A1 * | 4/2014 | Abdul-Rasool | B60W 10/02 |
| | | | 701/110 |
| 2015/0321675 A1 * | 11/2015 | Park | B60W 10/08 |
| | | | 701/53 |
| 2016/0082969 A1 * | 3/2016 | Jang | B60T 7/122 |
| | | | 477/7 |
| 2016/0185247 A1 | 6/2016 | Sakaguchi | |
| 2016/0185254 A1 * | 6/2016 | Ariyoshi | B60K 6/48 |
| | | | 701/22 |
| 2017/0066437 A1 * | 3/2017 | Yamamoto | B60K 6/48 |
| 2017/0120880 A1 * | 5/2017 | Bousamra | B60T 8/17 |
| 2018/0290655 A1 * | 10/2018 | Sato | B60W 30/18118 |

FOREIGN PATENT DOCUMENTS

| | | |
|---|---|---|
| JP | 2003-092803 A | 3/2003 |
| JP | 2007-329982 A | 12/2007 |
| JP | 2012-236523 A | 12/2012 |
| JP | 2012-239276 A | 12/2012 |
| JP | 2013-049368 A | 3/2013 |
| JP | 2013-172626 A | 9/2013 |
| JP | 2013-244781 A | 12/2013 |
| JP | 2015-116922 A | 6/2015 |
| JP | 2016-120877 A | 7/2016 |
| JP | 2016-201864 A | 12/2016 |

* cited by examiner

CONTROL DEVICE FOR TRANSPORT VEHICLE

CROSS-REFERENCE TO RELATED APPLICATION

The present application claims the benefit of priority of Japanese Patent Application No. 2017-052172, filed on Mar. 17, 2017, the content of which is incorporated herein by reference.

BACKGROUND

1. Field of the Invention

The present invention relates to a control device for a transport vehicle that can travels with a driving force output from an electric motor.

2. Description of the Related Art

In a control device for a vehicle disclosed in JP-A-2013-49368, since an accelerator pedal is depressed with a substantially constant operation amount on an uphill road, when it is determined that the vehicle is in a "stalled state" being stopped in a state in which an output torque is transmitted to driving wheels from an electric motor, a motor torque instruction value is generated so that the output torque of the electric motor decreases and a brake torque instruction value is generated so that a braking power of a brake unit is increased by a braking power equivalent to an decrement in the output torque of the electric motor when a temperature of a source power supply circuit rises to a temperature equal to or higher than a predetermined value.

When the vehicle disclosed in JP-A-2013-49368 is stalled, overheating of the source power supply circuit is prevented by the decrease in the output torque of the electric motor and the braking power of the brake unit is used to compensate the decrement in the output torque of the electric motor.

When the driver depresses the accelerator pedal to move the vehicle in this situation, the braking power of the brake unit is eliminated and the output torque of the electric motor may be increased, but the braking power of the brake unit changes depending on a hydraulic pressure of hydraulic oil and the hydraulic pressure does not change instantaneously. Therefore, there is a problem that, even when the driver depresses the accelerator pedal, the vehicle can hardly move until the brake hydraulic pressure changes.

SUMMARY

The invention is to provide the control device for the transport vehicle which prevents an overload and suppresses a backward movement in the stalled state and can move rapidly a vehicle according to a starting request.

According to a first aspect of the invention, there is provided a control device for a transport vehicle configured to travel with a driving force output from an electric motor, wherein when the transport vehicle is driven by a driving force of the electric motor, the control device performs a driving force limit control to reduce the driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more.

According to a second aspect of the invention, in the control device according to the first aspect, when the transport vehicle is driven by the driving force of the electric motor, the control device performs the driving force limit control in a case of satisfying conditions that the parameter relating to the traveling speed of the transport vehicle is less than the first threshold value, a torque required for the electric motor is equal to or larger than a second threshold value, and a state in which the parameter is less than the first threshold value and the required torque is equal to or larger than the second threshold value continues for the predetermined time or more.

According to a third aspect of the invention, in the control device according to the first aspect or the second aspect, the electric motor is a polyphase electric motor, and the first threshold value is an upper limit value at which a load is capable of concentrating on one phase in the electric motor or an electric device for driving the electric motor.

According to a fourth aspect of the invention, in the control device according to any one of the first to third aspects, when an accelerator pedal opening of the transport vehicle is equal to or larger than a third threshold value, the driving force limit control is not performed even when the conditions are satisfied.

According to a fifth aspect of the invention, in the control device according to the fourth aspect, the third threshold value is a maximum value of the accelerator pedal opening in the transport vehicle.

According to a sixth aspect of the invention, in the control device according to any one of the first to fifth aspects, the control device compares an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state, and when the absolute value of the total driving force is smaller than the riding-over driving force and the conditions are satisfied, the control device performs the driving force limit control.

According to a seventh aspect of the invention, in the control device according to any one of the first to fifth aspects, the transport vehicle includes a driving source for driving the transport vehicle, the control device compares an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state, and when the absolute value of the total driving force is larger than the riding-over driving force and the conditions are satisfied, the control device performs the driving force limit control and a driving force enlargement control to enlarge a driving force of the driving source.

According to an eighth aspect of the invention, in the control device according to the seventh aspect, an increment in the driving force of the driving source due to the driving force enlargement control is equal to a difference between the absolute value of the total driving force and the riding-over driving force.

According to a ninth aspect of the invention, in the control device according to the seventh aspect or the eighth aspect, the electric motor drives one driving axle of the transport vehicle, and the driving source drives the other driving axle of the transport vehicle.

According to the first aspect, when the stalled state of the transport vehicle continues for the predetermined time or more, the driving force of the electric motor is reduced based on the coefficient of static friction of the transport vehicle. The driving force of the electric motor is reduced by the driving force limit control, and thus it is possible to prevent an overload that may be generated during driving without the rotation of the electric motor. Further, since the driving force limit control is performed on the electric motor based on the coefficient of static friction of the transport vehicle, it is possible to suppress the backward movement of the transport vehicle. In addition, since the driving force limit control is performed without relying on the braking power due to the locking elements such as brakes, the transport vehicle can move immediately when the movement of the transport vehicle waiting for the stall jump is requested.

Even when the parameter relating to the traveling speed of the transport vehicle is less than the first threshold value, if the required torque for the electric motor is small, the electric motor is not overloaded. According to the second aspect, since the driving force limit control is performed only in the stalled state in which the device for driving the electric motor is overloaded, the execution of the unnecessary driving force limit control can be prevented.

In the transport vehicle, no overloading occurs unless one phase concentration does not occur in the electric motor, which is a polyphase electric motor, or the electric device for driving the electric motor. According to the third aspect, the driving force limit control is performed only when the condition that the parameter relating to the traveling speed of the transport vehicle is less than the upper limit value at which one phase concentration can occur in the electric motor or the electric device for driving the electric motor is satisfied, the execution of the unnecessary driving force limit control can be prevented.

Even when the condition is satisfied, if the accelerator pedal opening is as large as the third threshold value or more, there is a possibility that the effect such as overload prevention cannot be obtained even when the driving force limit control is performed. According to the fourth aspect, since the driving force limit control is not performed when the accelerator pedal opening is large enough that it is estimated that the effect of the driving force limit control cannot be obtained, the execution of the unnecessary driving force limit control can be prevented.

Even when the condition is satisfied, if the accelerator pedal opening is the maximum value (full open of accelerator), the driving force does not increase even when the driving force limit control is performed. According to the fifth aspect, since the driving force limit control is not performed when the driving force does not increase even if the driving force limit control is performed, the execution of the unnecessary driving force limit control can be prevented. In addition, when it is determined that the driving force limit control is not performed at the time of fully opening of the accelerator, it is possible to inform the driver, using voice or meter display, that the driving force reaches the limit.

According to the sixth aspect, as a result of comparison between the absolute value of the total driving force after the driving force limit control and the riding-over driving force based on the friction due to the coefficient of static friction, when the absolute value of the total driving force is smaller than the riding-over driving force, the transport vehicle does not move backward even when the driving force of the electric motor is reduced by the driving force limit control. Therefore, it is possible to prevent the overload by reducing the driving force of the electric motor and to suppress the backward movement of the transport vehicle without using a new driving force or the braking power of the locking element such as a brake. In addition, according to the sixth aspect, since the driving force limit control is performed without relying on the braking power of a locking element such as a brake, the vehicle can move immediately when the movement of the vehicle waiting for the stall jump is requested.

As a result of comparison between the absolute value of the total driving force after the driving force limit control and the riding-over driving force based on the friction due to the coefficient of static friction, when the absolute value of the total driving force is larger than the riding-over driving force, the transport vehicle moves backward when the driving force of the electric motor is reduced by the driving force limit control. However, according to the seventh aspect, since the driving force limit control for preventing the overload is performed, when the transport vehicle moves backward due to the driving force limit control, the driving force enlargement control is performed to increase the driving force of the internal combustion engine, and thus the backward movement of the transport vehicle can be suppressed. In addition, according to the seventh aspect, since the driving force limit control is performed without relying on the braking power of a locking element such as a brake, the vehicle can move immediately when the movement of the vehicle waiting for the stall jump is requested.

According to the eighth aspect, the increment of the driving force of the driving source due to the driving force enlargement control is equal to the difference between the absolute value of the total driving force after the driving force limit control and the riding-over driving force. In this case, since the absolute value of the total driving force after the driving force limit control and the driving force enlargement control is equal to the riding-over driving force, the transport vehicle is held in the state immediately before the backward movement and the backward movement of the vehicle is suppressed. On the other hand, even when the driving force is increased higher than the difference, the backward movement of the transport vehicle is suppressed, but the fuel consumption amount of the driving source increases. Therefore, according to the eighth aspect, when the driving force of the driving source is increased by the difference between the absolute value of the total driving force after the driving force limit control and the riding-over driving force, it is possible to suppress the backward movement of the transport vehicle and to prevent the deterioration of the fuel consumption amount.

According to the ninth aspect, the driving axle driven by the electric motor and the driving axle driven by the driving source are independent axles in the same transport vehicle. Therefore, when comparing with a case where the electric motor 157 and the driving source drive the same driving axle, it is possible to avoid complication of control when the driving force limit control and the driving force enlargement control are performed in combination.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 8 is a diagram illustrating an internal configuration of a transmission according to another embodiment and a relation between the transmission and an internal combustion engine, an electric motor, and the like.

DETAILED DESCRIPTION OF THE INVENTION

A hybrid electric vehicle (HEV) mounted with a control device according to an embodiment of the invention will be described below with reference to the drawings.

Figure 1:
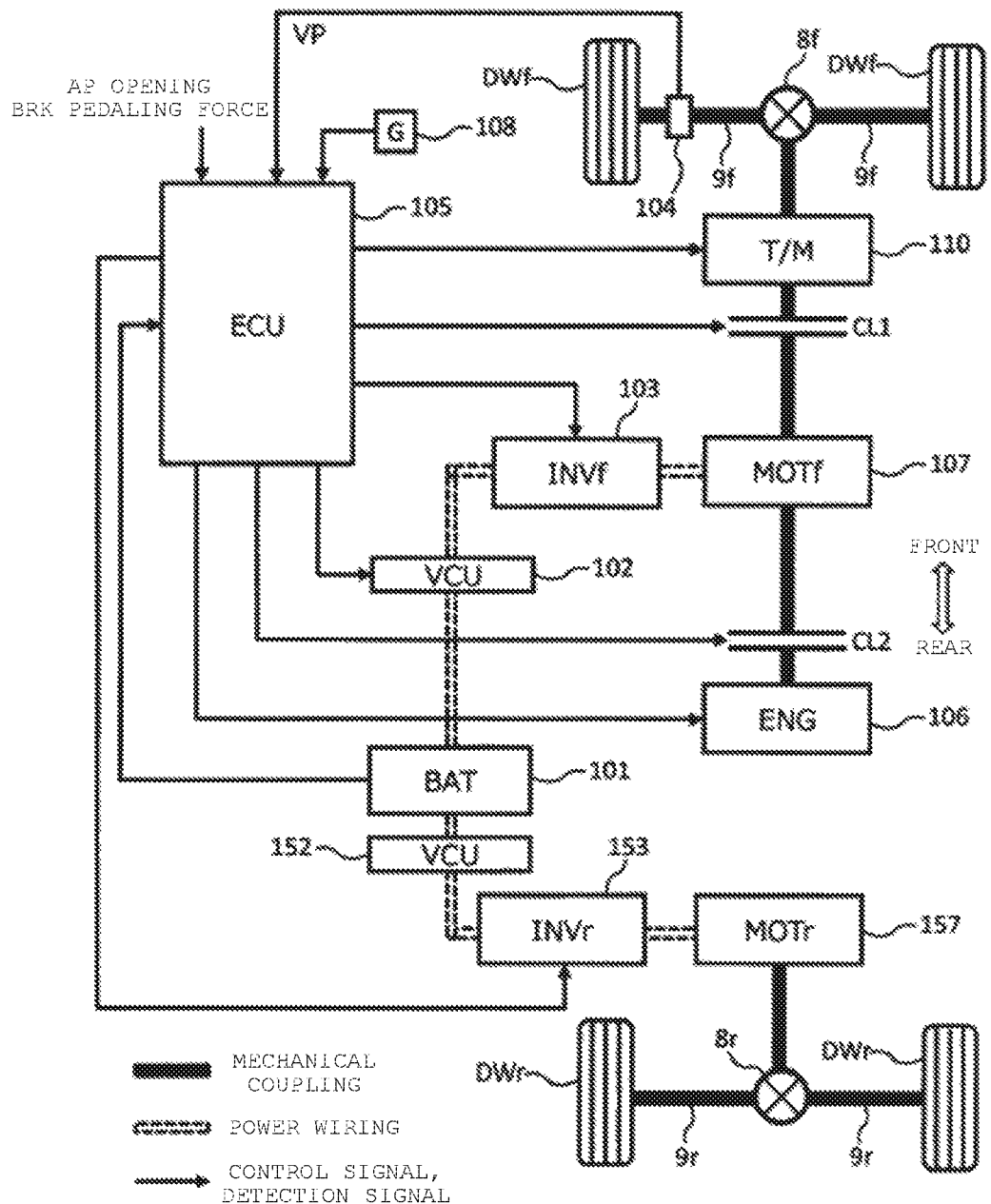
FIG. 1 is a block diagram illustrating an internal configuration of a hybrid electric vehicle according to one embodiment.

FIG. 1 is a block diagram illustrating an internal configuration of the hybrid electric vehicle according to the embodiment. The hybrid electric vehicle (hereinafter, simply referred to as a "vehicle") illustrated in FIG. 1 includes an internal combustion engine (ENG) 106, an electric motor (MOTf) 107, a transmission (T/M) 110, a connecting/disconnecting unit CL1, a connecting/disconnecting unit CL2, a battery (BAT), 101, a VCU (Voltage Control Unit) 102, an inverter (INVf) 103, a speed sensor 104, an acceleration sensor 108, an electric motor (MOTr) 157, a VCU (Voltage Control Unit) 152, an inverter (INVr) 153, and an ECU (Electronic Control Unit) 105. The vehicle travels with power of the internal combustion engine 106 and/or the electric motors 107 and 157 according to traveling conditions, for example. In FIG. 1, a thick solid line indicates mechanical coupling, a double dotted line indicates power wiring, and a thin solid line arrow indicates a control signal or a detection signal.

The internal combustion engine 106 outputs a driving force that travels a vehicle. The driving force output from the internal combustion engine 106 is transmitted to front driving wheels DWf via the connecting/disconnecting unit CL1, the connecting/disconnecting unit CL2, the transmission 110, a differential gear 8f, and a driving axle 9f. The electric motor 107 is a three-phase brushless DC motor, and outputs a driving force for traveling the vehicle and/or power for starting the internal combustion engine 106. The driving force for the vehicle traveling output from the electric motor 107 is transmitted to the front driving wheels DWf via the connecting/disconnecting unit CL1, the transmission 110, the differential gear 8f, and the driving axle 9f. In addition, the electric motor 107 can operate as a generator at the time of braking of the vehicle (regenerative operation).

The transmission 110 shifts the driving force output from at least one of the internal combustion engine 106 and the electric motor 107 at a predetermined gear ratio and transmits the shifted driving force to the driving wheels DWf. The gear ratio of the transmission 110 is changed according to an instruction from the ECU 105. The transmission 110 may be a transmission in which a plurality of different gear ratios are set stepwise or a continuously variable transmission capable of continuously changing the gear ratio.

The connecting/disconnecting unit CL1 connects and disconnects a power transmission path between the transmission 110 and the electric motor 107 according to an instruction from the ECU 105. The connecting/disconnecting unit CL2 connects and disconnects a power transmission path between the electric motor 107 and the internal combustion engine 106 according to an instruction from the ECU 105.

The battery 101 includes a plurality of battery cells which are connected to each other in series or in parallel, and supplies a high voltage of 100 to 200 V, for example. The battery cells are, for example, a lithium ion battery or a nickel hydrogen battery. The VCU 102 raises a direct-current output voltage of the battery 101. In addition, the VCU 102 steps down the electric power that is generated by the electric motor 107 and converted into a direct current during the regenerative operation of the electric motor 107. The electric power stepped down by the VCU 102 is charged in the battery 101. The inverter 103 converts the DC voltage into an AC voltage and supplies a three-phase current to the electric motor 107. In addition, the inverter 103 converts the AC voltage generated by the electric motor 107 during the regenerative operation of the electric motor 107 into a DC voltage.

The speed sensor 104 detects a traveling speed of the vehicle (vehicle speed VP). A signal indicating the vehicle speed VP detected by the speed sensor 104 is sent to the ECU 105.

The acceleration sensor 108 detects acceleration acting in a front-rear direction of the vehicle (hereinafter, referred to as "front-rear acceleration"). A signal indicating the front-rear acceleration by the acceleration sensor 111 is set to the ECU 105. A value of the front-rear acceleration indicates a positive value when acceleration is applied in the front direction of the vehicle and a negative value when acceleration is applied in the rear direction of the vehicle. Therefore, the value of the front-rear acceleration indicates the positive value in a state where the vehicle is stopped on an uphill road, and the value of the front-rear acceleration indicates the negative value in a state where the vehicle is stopped on a downhill road. It is estimated that as an absolute value of the front-rear acceleration in a state where the vehicle is stopped on the inclined road becomes larger, the inclination of the road becomes greater.

The electric motor 157 is a three-phase brushless DC motor, and outputs a driving force for traveling the vehicle. The driving force for the vehicle traveling output from the electric motor 157 is transmitted to rear driving wheels DWr via a differential gear 8r and a driving axle 9r. In addition, the electric motor 157 can operate as a generator at the time of braking of the vehicle (regenerative operation).

The VCU 152 raises a direct-current output voltage of the battery 101. In addition, the VCU 152 steps down the electric power that is generated by the electric motor 157 and converted into a direct current during the regenerative operation of the electric motor 157. The electric power stepped down by the VCU 152 is charged in the battery 101. The inverter 153 converts the DC voltage into an AC voltage and supplies a three-phase current to the electric motor 157. In addition, the inverter 153 converts the AC voltage generated by the electric motor 157 during the regenerative operation of the electric motor 157 into a DC voltage.

Figure 2:
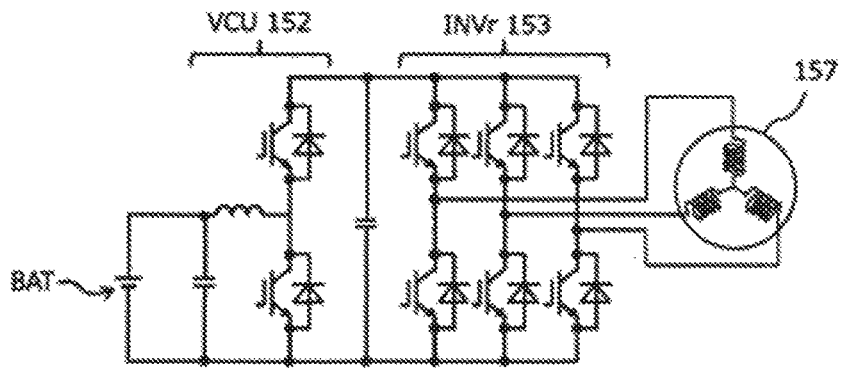
FIG. 2 is an electric circuit diagram illustrating a relation between a battery, a VCU, an inverter, and an electric motor.

FIG. 2 is an electric circuit diagram illustrating a relation between the battery 101, the VCU 152, the inverter 153, and the electric motor 157. As illustrated in FIG. 2, the VCU 152 switches on/off two switching elements using a voltage V1 output from the battery 101 as an input voltage, and thus raises an output-side voltage V2 to a voltage higher than the voltage V1. In addition, the inverter 153 switches on/off sequentially two switching elements corresponding to each phase, and converts the voltage V2 output from the VCU 152 into a three-phase AC voltage.

Three-phase AV voltage is applied to the electric motor 157. However, in a case where the electric motor 157 needs to output a torque in a state in which the rotor (not illustrated) of the electric motor 157 hardly rotates, an AC voltage is applied to only one phase of three phases. At this time, the inverter 153 is in a so-called one phase concentration state in which only two switching elements corresponding to the phase to which the AC voltage is applied to the electric motor 157 are switched on and off.

The ECU 105 performs an output control of the electric motor 107 under the control of the VCU 102 and the inverter 103, a control of the transmission 110, a connecting/disconnecting control of the connecting/disconnecting unit CL1 and the connecting/disconnecting unit CL2, a driving control of the internal combustion engine 106, and an output control of the electric motor 157 under the control of the VCU 152 and the inverter 153. In addition, the ECU 105 receives, for example, a signal indicating an accelerator pedal opening (AP opening) in response to an accelerator pedal operation of a vehicle driver and a signal indicating the vehicle speed VP from the speed sensor 104. The ECU 105 derives a driving force (hereinafter, referred to as a "required driving force") required for the vehicle based on the AP opening and the vehicle speed VP. The ECU 105 selects a vehicle traveling mode (to be described below) based on the vehicle speed VP and the required driving force, for example, and controls the states of the transmission 110, the connecting/disconnecting unit CL1, and the connecting/disconnecting unit CL2 and the driving forces output from the internal combustion engine 106 and the electric motors 107 and 157.

The vehicle according to the embodiment travels in any one of "EV traveling mode", "parallel traveling mode", and "engine traveling mode" in which a driving source including the internal combustion engine 106 and the electric motors 107 and 157 is different in the form of use.

During the acceleration traveling in the EV traveling mode, the vehicle travels with the driving force from the electric motor 107 and/or the electric motor 157. When the vehicle travels in the EV traveling mode, the ECU 105 allows the connecting/disconnecting unit CL1 to be locked, and opens the connecting/disconnecting unit CL2. During the acceleration traveling in the parallel traveling mode, the vehicle travels with combined power of the driving force from the internal combustion engine 106 and the driving force from the electric motor 107 and/or the electric motor 157. When the vehicle travels in the parallel traveling mode, the ECU 105 allows the connecting/disconnecting unit CL1 and the connecting/disconnecting unit CL2 to be locked together. During the acceleration traveling in the engine traveling mode, the vehicle travels with the driving force from the internal combustion engine 106. When the vehicle travels in the engine traveling mode, the ECU 105 allows the connecting/disconnecting unit CL1 and the connecting/disconnecting unit CL2 to be locked together.

In the vehicle having the configuration illustrated in FIG. 1, since the accelerator pedal is depressed with a substantially constant operation amount on the uphill road, the driving force output from at least one of the internal combustion engine 106 and the electric motor 107 is transmitted to the front driving axle 9f and the driving force output from the electric motor 157 is transmitted to the rear driving axle 9r, but the control of the ECU 105 in the "stalled state" in which the vehicle is stopped will be described in detail with reference to FIGS. 3 to 6.

Figure 3:
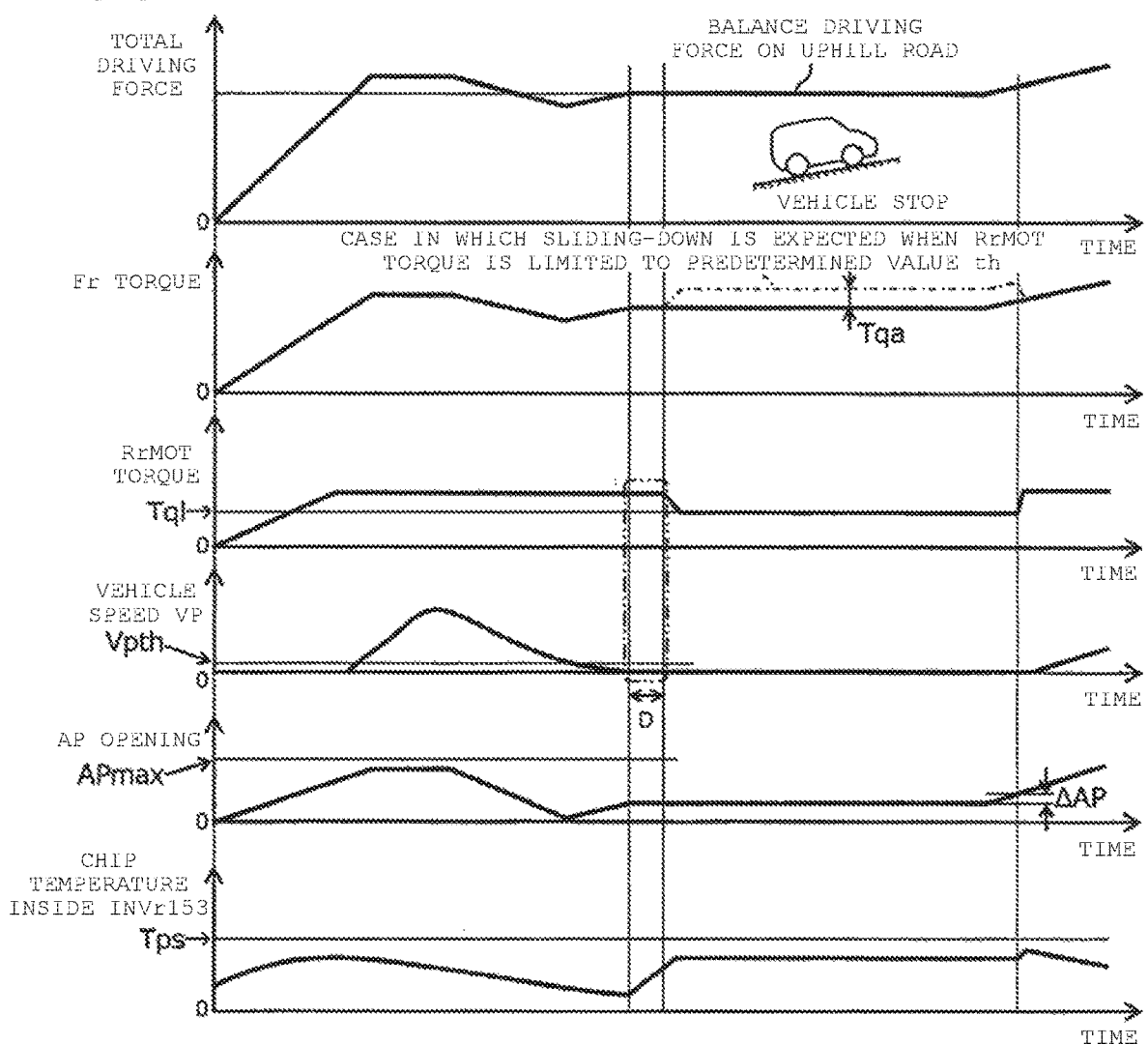
FIG. 3 is a graph illustrating an example of a change with time of parameters when restarts traveling after a vehicle traveling on an uphill road stops traveling and enters a stalled state.

FIG. 3 is a graph illustrating an example of a change with time of parameters when restarts traveling after the vehicle traveling on the uphill road stops traveling and enters the stalled state. In the example illustrated in FIG. 3, after the total of the driving forces (total driving force) transmitted to the front driving axle 9f and the rear driving axle 9r increases as the AP opening increases, the AP opening is not 0 but becomes smaller, so that the vehicle traveling on the uphill road stops in the middle of the uphill road. That is, since the AP opening is not 0 but is maintained at a substantially constant value, the vehicle enters a stalled state in which it stops on the uphill road. In the stalled vehicle, a torque (hereinafter, referred to as "RrMOT torque") required for the electric motor 157 connected to the driving axle 9r is larger than a predetermined value Tql, and the vehicle speed VP is less than a threshold value VPth. The threshold value VPth is an upper limit value at which a load can be concentrated on one phase in the inverter 153 for driving the electric motor 157 or the electric motor 157 which is rotated at a speed proportional to the vehicle speed VP.

From when the vehicle enters the stalled state, until the duration of the stalled state becomes equal to or longer than a predetermined time D, the ECU 105 performs the driving force limit control on the electric motor 157 when the AP opening is not equal to or larger than an threshold value APmax. The threshold value APmax is, for example, the maximum value of the AP opening in the vehicle. Even if the AP opening is equal to or larger than the threshold value APmax, when the RrMOT torque is high and the vehicle speed VP is low, for example, it is considered that the vehicle is under a circumstance that it rides over obstacles such as curbstones. Under this circumstance, it is not preferable to perform the driving force limit control on the electric motor 157. For this reason, even if the duration of the stalled state is equal to or longer than the predetermined time D, when the AP opening is equal to or larger than the threshold value APmax, the ECU 105 does not perform the driving force limit control. In this case, the ECU 105 may inform the driver, using voice or meter display, that the driving force reaches the limit.

When the RrMOT torque is lowered to the predetermined value Tql by the driving force limit control on the electric motor 157, the one phase concentration state in the electric motor 157 and the inverter 153 does not change, but a value of a current flowing through the electric motor 157 and the inverter 153 decreases, so that overheating due to the one phase concentration can be prevented. In the example illustrated in FIG. 3, when the vehicle enters the stalled state, a chip temperature in the inverter 153 rapidly rises, but the RrMOT torque is lowered by the driving force limit control, whereby the chip temperature is maintained in the state less than the threshold value Tps by power saving of the electric motor 157. The predetermined value Tql, which is a limit value of the RrMOT torque due to the driving force limit control, is an upper limit value that can suppress the rise of the chip temperature even in the one phase concentration state.

Figure 4:
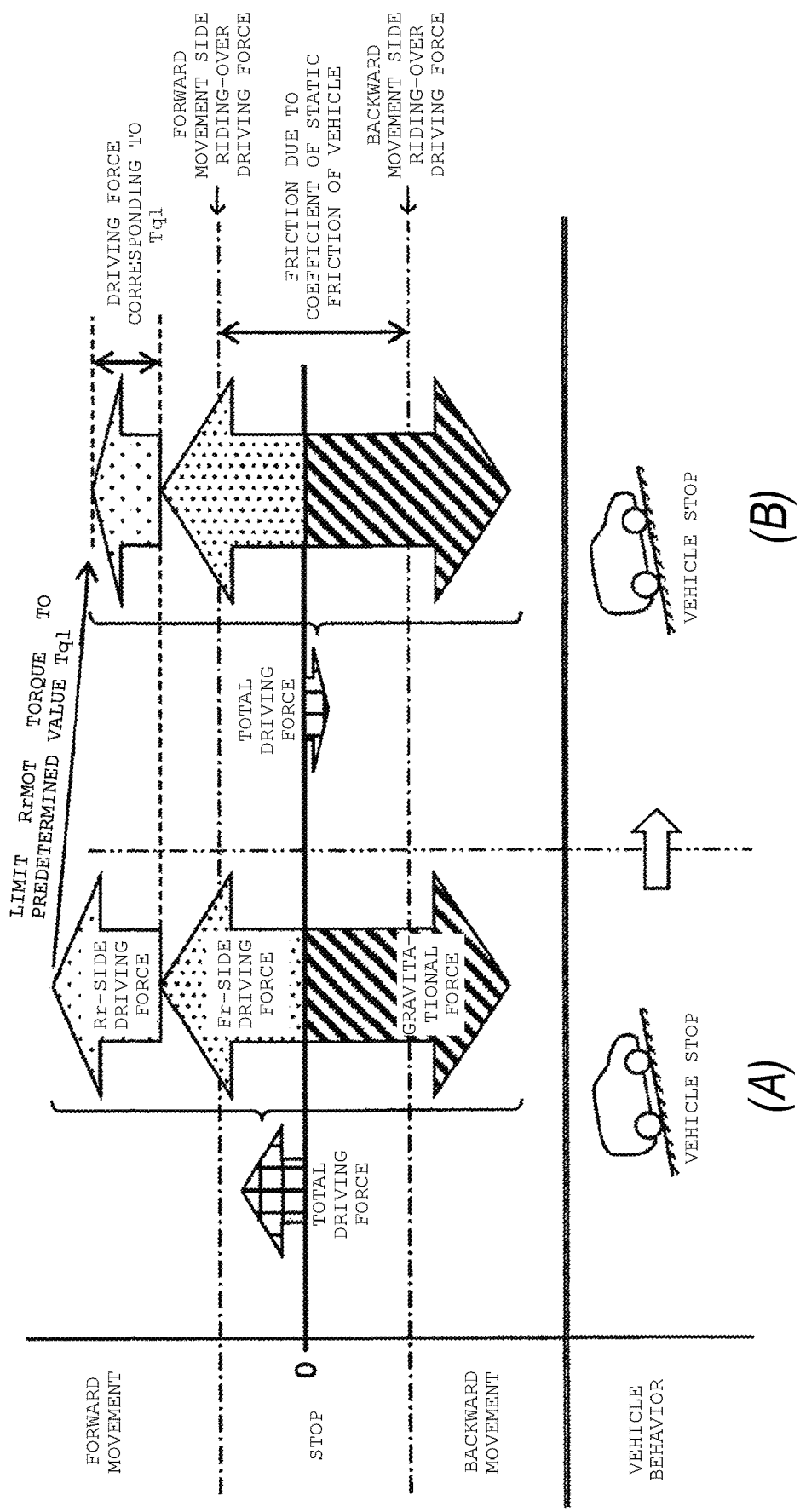
FIG. 4 is a conceptual diagram illustrating an example of a change in driving force before and after a driving force limit control is performed on a stalled vehicle.
Figure 5:
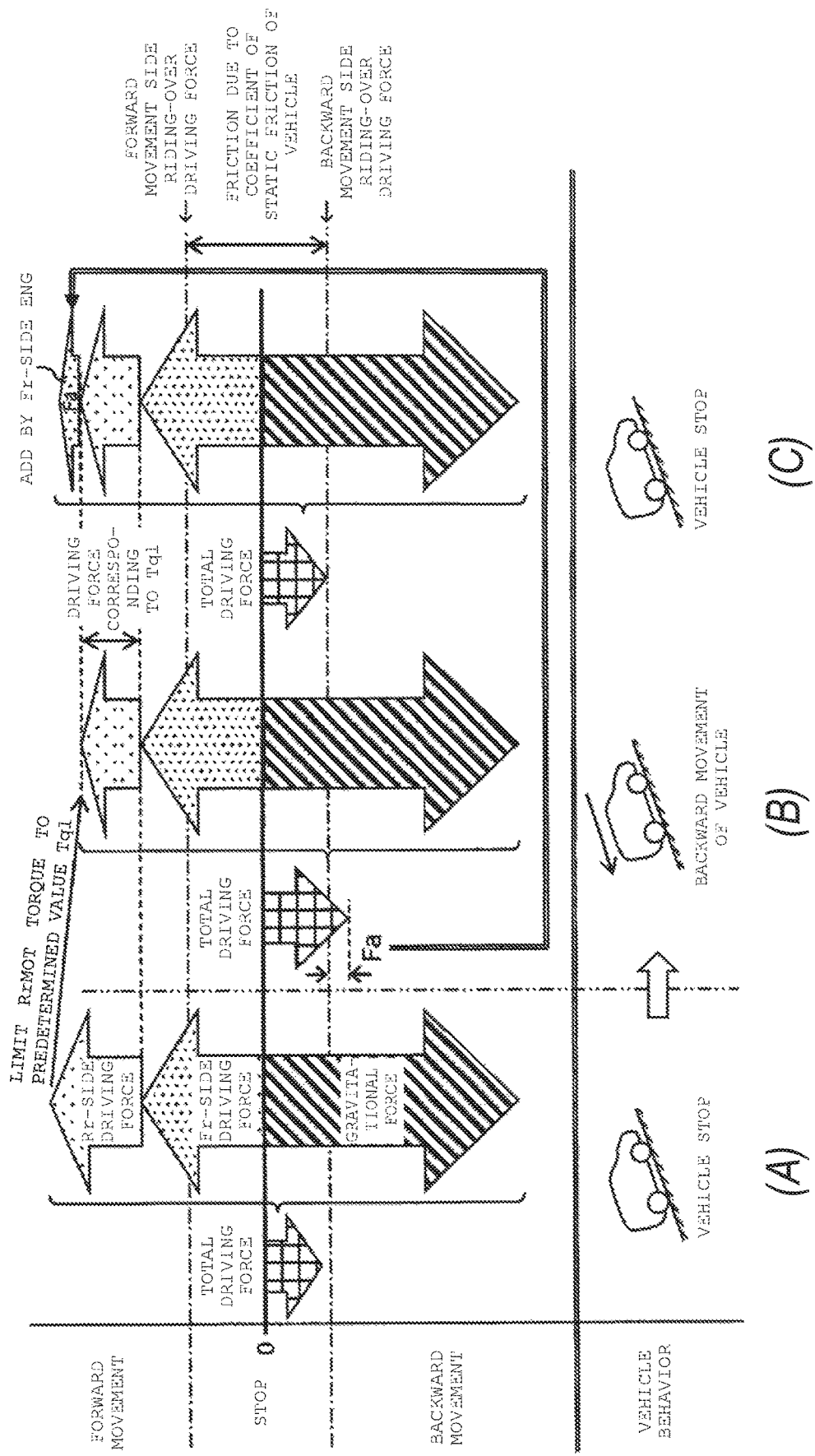
FIG. 5 is a conceptual diagram illustrating another example of a change in driving force before and after a driving force limit control is performed on a stalled vehicle.

FIGS. 4 and 5 are conceptual diagrams illustrating an example and another example of a change in driving force before and after the driving force limit control is performed on the stalled vehicle. In the vehicle stopped in the stalled state, as illustrated in a section (A) of FIG. 4 and a section (A) of FIG. 5, an absolute value of a total driving force is smaller than a riding-over driving force based on the friction due to the coefficient of static friction of the vehicle, the total driving force being a value obtained by the sum of a gravitational force applied to the vehicle on the uphill road, a driving force (Fr-side driving force) transmitted to the front driving axle 9f from at least one of the internal combustion engine 106 and the electric motor 107, and a driving force (Rr-side driving force) transmitted to the rear driving axle 9r from the electric motor 157. For this reason, the vehicle can maintain the stopped state. The friction due to the coefficient of static friction of the vehicle is a unique value of the vehicle.

When the driving force limit control for the electric motor 157 is started in the state illustrated in the section (A) of FIG. 4 or the section (A) of FIG. 5, since the RrMOT torque is limited to the predetermined value Tql, the Rr-side driving force decreases. When the absolute value of the total driving force during the driving force limit control is smaller than the riding-over driving force as illustrated in a section (B) of FIG. 4, the stopped state of the vehicle does not change. However, as illustrated in a section (B) of FIG. 5, when the absolute value of the total driving force exceeds the riding-over driving force, the vehicle moves backward. Therefore, in the embodiment, as illustrated in a section (C) of FIG. 5, the ECU 105 performs a driving force enlargement control such that the internal combustion engine 106 further outputs a driving force Fa equal to a difference between the absolute value of the total driving force due to the driving force limit control and the riding-over driving force. As a result, the absolute value of the total driving force during the driving force limit control and the driving force enlargement control becomes smaller than the riding-over driving force, and the vehicle can maintain the stopped state.

In the state where the driving force limit control being performed on the electric motor 157 described above, that is, during waiting of a stall jump, when the driver depresses the accelerator pedal to move the vehicle and thus an increment ΔAP of the AP opening exceeds a threshold value "th", the ECU 105 cancels the driving force limit control. At this time, since the driving force limit control is performed without relying on the braking power of a locking element such as a brake, the vehicle can move immediately. The ECU 105 may cancel the driving force limit control for the electric motor 157 when the vehicle speed VP becomes equal to or larger than threshold value VPth and one phase concentration does not occur in the electric motor 157 or the inverter 153.

Figure 6:
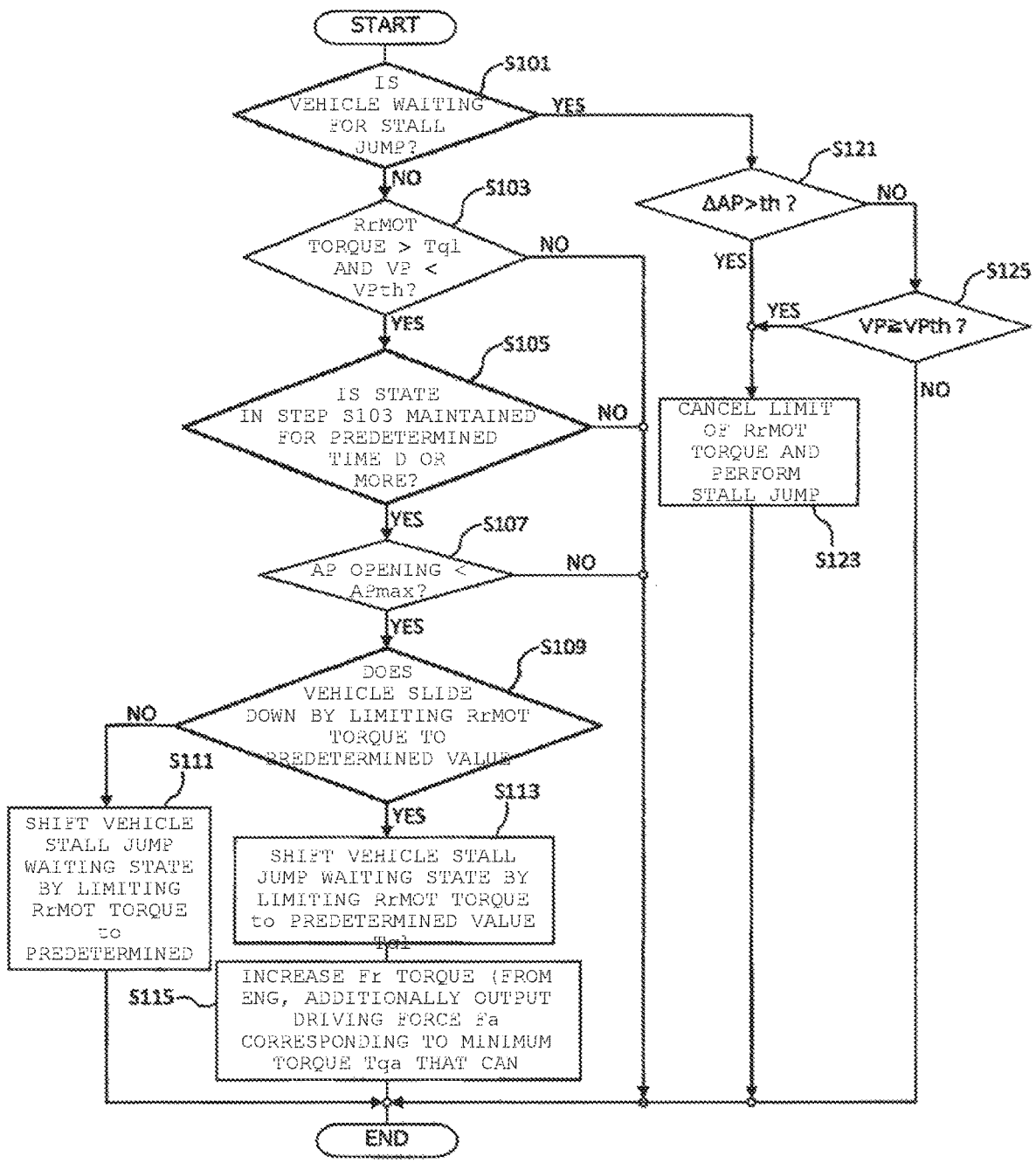
FIG. 6 is a flowchart illustrating a flow of processing performed by an ECU in a stalled vehicle.

FIG. 6 is a flowchart illustrating a flow of processing performed by the ECU 105 in the stalled vehicle. As illustrated in FIG. 6, the ECU 105 determines whether the vehicle is waiting for a stall jump (step S101). If the vehicle is not waiting for the stall jump, the process proceeds to step S103, and if the vehicle is waiting for the stall jump, the process proceeds to step S121. In step S103, the ECU 105 determines whether the vehicle is in the stalled state, that is, the RrMOT torque is larger than the predetermined value Tql (RrMOT torque>Tql) and the vehicle speed VP is less than the threshold value VPth (VP<VPth). If the vehicle is in the stalled state, the process proceeds to step S105, and if the vehicle is not in the stalled state, a series of processes are terminated. In step S105, the ECU 105 determines whether the stalled state has continued for a predetermined time D or more. If the stalled state has continued, the process proceeds to step S107, and if not, a series of processes are terminated.

In step S107, the ECU 105 determines whether the AP opening is less than the threshold value APmax (AP opening<APmax). If AP opening<APmax, the process proceeds to step S109, and if AP opening≥APmax, a series of processes are terminated. In step S109, as a result of limiting the RrMOT torque to the predetermined value Tql by performing the driving force limit control on the electric motor 157, the ECU 105 determines whether the vehicle stopped on the uphill road slides down from the signal indicating the front-rear acceleration obtained from the acceleration sensor 108. If the vehicle does not slide down, the process proceeds to step S111, and if the vehicle slides down, the process proceeds to step S113. Whether the vehicle stopped on the uphill road slides down may be determined by calculation based on the front-rear acceleration obtained from the acceleration sensor 108 as described above, or may be determined based on whether the sliding-down actually occurs when the driving force limit control is performed on the electric motor 157.

In step S111, the ECU 105 shifts the vehicle to a stall jump waiting state by limiting the RrMOT torque to the predetermined value Tql. In step S113, the ECU 105 also shifts the vehicle to the stall jump waiting state by limiting the RrMOT torque to the predetermined value Tql, and then the process proceeds to step S115. In step S115, the ECU 105 performs driving force enlargement control so that the internal combustion engine 106 further outputs the driving force Fa corresponding to a minimum torque Tqa (see FIG. 2) that can prevent the sliding-down.

On the other hand, in step S121 to which the process proceeds when it is determined in step S101 that the vehicle is waiting for the stall jump, the ECU 105 determines whether a variation amount ΔAP of the AP opening exceeds the threshold value "th" (ΔAP>th). If ΔAP>th, the process proceeds to step S123, and if ΔAP≤th, the process proceeds to step S125. In step S125, the ECU 105 determines whether the vehicle speed VP is equal to or larger than the threshold value VPth (VP≥VPth). If VP≥VPth, the process proceeds to step S125, and if VP<VPth, a series of processes are terminated. In step S123, the ECU 105 cancels the driving force limit control on the electric motor 157 and performs a stall jump.

As described above, according to the embodiment, when the stalled state, in which the RrMOT torque is larger than the predetermined value Tql and the vehicle speed VP is less than the threshold value VPth, continues for the predetermined time D or more, if the AP opening is not equal to or larger than the threshold value APmax, the driving force limit control is performed on the electric motor 157 based on the coefficient of static friction of the vehicle. The driving force of the electric motor 157 is reduced by the driving force limit control, and thus it is possible to prevent an overload that may be generated during driving without the rotation of the electric motor 157. Further, since the driving force limit control is performed on the electric motor 157 based on the coefficient of static friction of the vehicle, it is possible to suppress the backward movement of the vehicle stopped on the uphill road. In addition, since the driving force limit control is performed without relying on the braking power due to the locking elements such as brakes, the vehicle can move immediately when the movement of the vehicle waiting for the stall jump is requested.

In determining whether the vehicle is in the stalled state, if the RrMOT torque is small, the electric motor 157 is not overloaded. Further, in determining whether the vehicle is in the stalled state, unless one phase concentration occurs in the electric motor 157 or the inverter 153, no overload occur in the electric motor 157 or the inverter 153. In the embodiment, when the conditions that the RrMOT torque is larger than the predetermined value Tql and the vehicle speed VP is less than the threshold value VPth are satisfied, it is determined that the vehicle is stalled, and thus it is possible to prevent execution of unnecessary driving force limit control. Even when the conditions are satisfied, if the AP opening is equal to or larger than the threshold value APmax (the maximum value of the AP opening), there is a possibility that the effect such as overload prevention cannot be obtained even when the driving force limit control is performed. For this reason, as in the embodiment, when the AP opening is equal to or larger than the threshold value APmax, the driving force limit control is not performed, and thus the execution of the unnecessary driving force limit control can be prevented.

In addition, as a result of comparison between the absolute value of the total driving force after the driving force limit control and the riding-over driving force based on the friction due to the coefficient of static friction, when the absolute value of the total driving force is smaller than the riding-over driving force, the vehicle does not move backward even when the driving force of the electric motor 157 is reduced by the driving force limit control. Therefore, it is possible to prevent the overload by reducing the driving force of the electric motor 157 and to suppress the backward movement of the vehicle without using a new driving force or the braking power of the locking element such as a brake.

On the other hand, as a result of comparison between the absolute value of the total driving force after the driving force limit control and the riding-over driving force based on the friction due to the coefficient of static friction, when the absolute value of the total driving force is larger than the riding-over driving force, the vehicle moves backward when the driving force of the electric motor 157 is reduced by the driving force limit control. In the embodiment, however, when the vehicle moves backward due to the driving force limit control, the driving force enlargement control is performed to increase the driving force of the internal combustion engine 106, and thus the backward movement of the vehicle can be suppressed.

The increment of the driving force of the internal combustion engine 106 due to the driving force enlargement control is equal to the difference between the absolute value of the total driving force after the driving force limit control and the riding-over driving force. In this case, since the absolute value of the total driving force after the driving force limit control and the driving force enlargement control is equal to the riding-over driving force, the vehicle is held in the state immediately before the backward movement and the backward movement of the vehicle is suppressed. On the other hand, even when the driving force is increased higher than the difference, the backward movement of the vehicle is suppressed, but the fuel consumption amount of the internal combustion engine 106 increases. Therefore, as in the embodiment, when the driving force of the internal combustion engine 106 is increased by the difference between the absolute value of the total driving force after the driving force limit control and the riding-over driving force, it is possible to suppress the backward movement of the vehicle and to prevent the deterioration of the fuel consumption amount. However, in the case where the fuel consumption amount can be suppressed by increasing the driving force of the internal combustion engine 106 beyond the differential value, exceptionally, the ECU 105 adjusts the driving force within a range in which the backward movement of the vehicle can be suppressed.

In the embodiment, the driving axle 9r driven by the electric motor 157 and the driving axle 9f driven by the internal combustion engine 106 are independent axles in the same vehicle. Therefore, when comparing with a case where the electric motor 157 and the internal combustion engine 106 drive the same driving axle, it is possible to avoid complication of control when the driving force limit control and the driving force enlargement control are performed in combination.

It is to be noted that the invention is not limited to the embodiment described above, but may be appropriately modified, improved, and the like. For example, the embodiment exemplifies the case where the vehicle traveling on the uphill road stops traveling and enters the stalled state, but the invention can also be applied to a case where a vehicle traveling backwards on a downhill road stops traveling and enters a stalled state.

In addition, the invention may be a configuration in which the electric motor 107, the inverter 103, and the VCU 102 are excluded from the configuration illustrated in FIG. 1. Further, the invention may be a configuration in which the internal combustion engine 106 is excluded from the configuration illustrated in FIG. 1, but, in this case, the driving force enlargement control cannot be performed. Therefore, in the case of YES in step S109 of FIG. 6, the process does not proceed to step S113 and a series of processes are terminated. In addition, the driving force limit control is performed on the electric motor 157, but may be performed on the electric motor 107 when the electric motor 157 is not provided.

Figure 7:
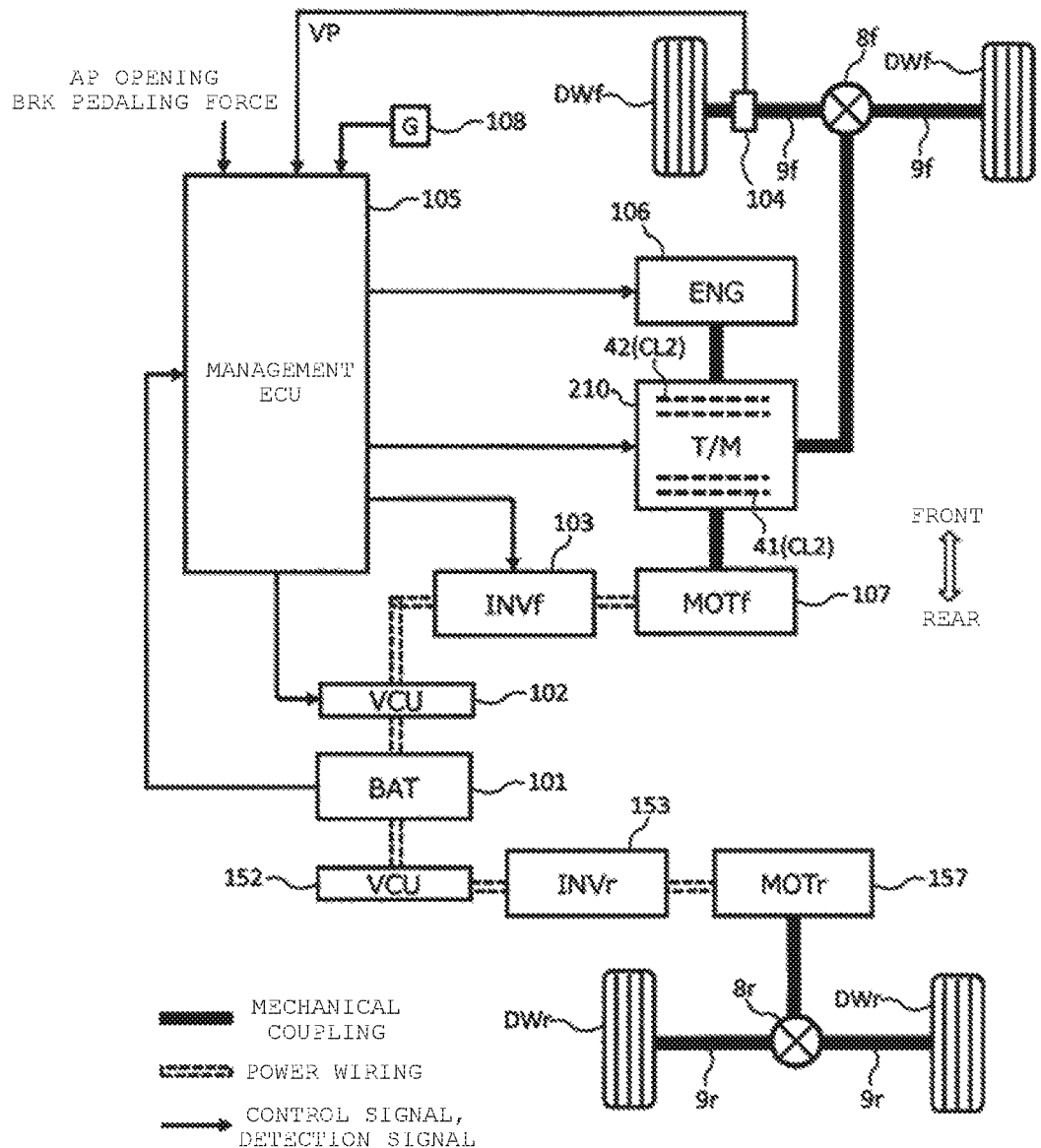
FIG. 7 is a block diagram illustrating an internal configuration of a hybrid electric vehicle according to another embodiment.
Figure 8:
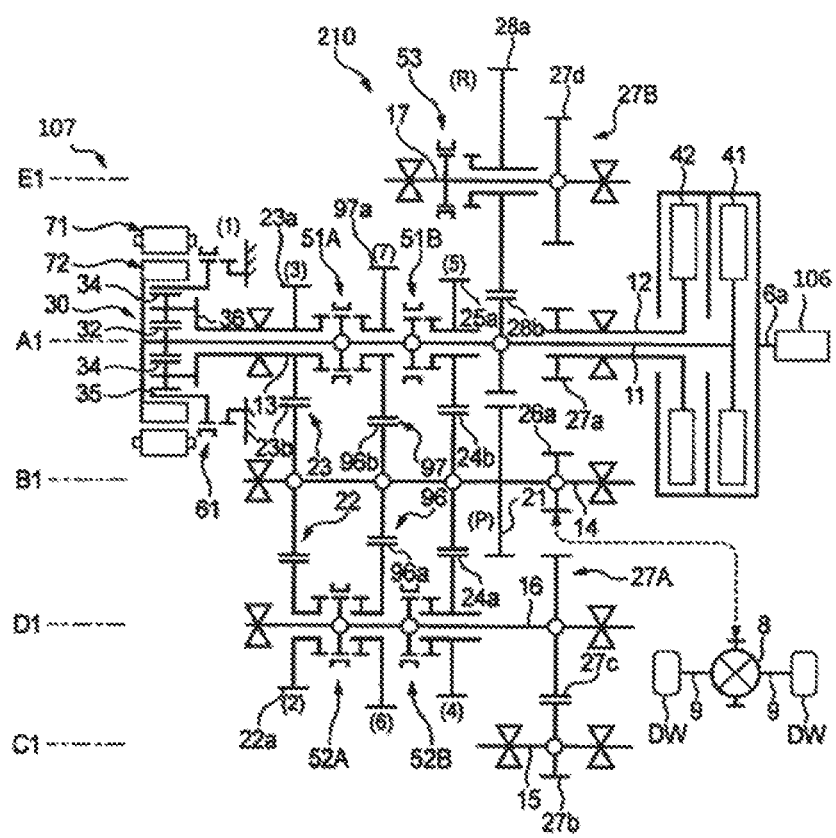

Further, the invention may use a hybrid vehicle using a driving system illustrated in FIGS. 7 and 8 using a twin-clutch type transmission, instead of the driving system in which the driving force is applied to the front driving axle 9f illustrated in FIG. 1. In FIG. 7, the constituent elements common to the configuration in FIG. 1 are denoted by the same reference numerals, and the description thereof will be simplified or omitted.

FIG. 7 is a block diagram illustrating an internal configuration of a hybrid electric vehicle according to another embodiment. The hybrid electric vehicle (hereinafter, simply referred to as a "vehicle") illustrated in FIG. 7 includes an internal combustion engine (ENG) 106, an electric motor (MOTf) 107, a transmission (T/M) 210, a battery (BAT) 101, a VCU (Voltage Control Unit) 102, an inverter (INVf) 103, a speed sensor 104, an electric motor (MOTr) 157, a VCU (Voltage Control Unit) 152, an inverter (INVr) 153, and an ECU (Electronic Control Unit) 105. The vehicle travels with power of the internal combustion engine 106 and/or the electric motors 107 and 157 according to traveling conditions, for example. In FIG. 7, a thick solid line indicates mechanical coupling, a double dotted line indicates power wiring, and a thin solid line arrow indicates a control signal or a detection signal. FIG. 8 is a diagram illustrating an internal configuration of a transmission 210 according to another embodiment and a relation between the transmission 210 and an internal combustion engine 106, an electric motor 107, and the like.

The internal combustion engine 106 outputs a driving force that travels a vehicle. The power output from the internal combustion engine 106 is transmitted to front driving wheels DWf via the transmission 210, a differential gear 8*f*, and a driving axle 9*f*. On a crankshaft 6*a* of the internal combustion engine 106, a first clutch 41 and a second clutch 42 of the transmission 210 are provided.

The electric motor 107 outputs the power for the vehicle to travel and/or the power for starting the internal combustion engine 106. The power for the vehicle traveling output from the electric motor 107 is transmitted to the front driving wheel DWf via the transmission 210, the differential gear 8*f*, and the driving axle 9*f*. In addition, the electric motor 107 can operate (regenerative operation) as a generator at the time of braking of the vehicle.

The electric motor 107 is a three-phase brushless DC motor, includes a stator 71 and a rotor 72 facing the stator 71, and is disposed on the outer peripheral side of a ring gear 35 of a planetary gear mechanism 30. The rotor 72 is connected to a sun gear 32 of the planetary gear mechanism 30, and is configured to rotate integrally with the sun gear 32 of the planetary gear mechanism 30.

The planetary gear mechanism 30 has the sun gear 32, the ring gear 35 which is disposed concentrically with the sun gear 32 and which is disposed so as to surround the periphery of the sun gear 32, planetary gears 34 which are made to mesh with the sun gear 32 and the ring gear 35, and a carrier 36 which supports the planetary gears 34, allowing them to revolve on their own axes and roll "walk" around the sun gear 32. In this way, the sun gear 32, the ring gear 35 and the carrier 36 are made to rotate differentially relative to each other.

A lock mechanism 61, which has a synchromesh mechanism and which is adapted to stop (lock) the rotation of the ring gear 35, is provided on the ring gear 35. A brake mechanism or the like may be used as the lock mechanism 61.

The transmission 210 shifts the power output from at least one of the internal combustion engine 106 and the electric motor 107 at a predetermined gear ratio and transmits the shifted driving force to the driving wheels DWf. The gear ratio of the transmission 210 is changed according to an instruction from the ECU 105. An internal configuration of the transmission 210 will be described below.

The control of the transmission 210 by the ECU 105 includes a control first and second odd-numbered gear change shifters 51A and 51B (to be described below) constituting the transmission 210, a control of first and second even-numbered gear change shifters 52A and 52B, a control of a reverse shifter 53, a control of a lock mechanism 61, a connecting/disconnecting control of a first clutch 41, and a connecting/disconnecting control of a second clutch 42.

Details of the internal configuration of the transmission 210 will be described below.

The transmission 210 is a so-called double-clutch type transmission which includes the first clutch 41, the second clutch 42 and the planetary gear mechanism 30, which have already been described, as well as plural change-speed gear trains, which will be described later.

More specifically, the transmission 210 includes a first main shaft 11 which is disposed coaxially with a crankshaft 6*a* of the internal combustion engine 106 (a rotational axis A1), a second main shaft 12, a connecting shaft 13, a counter shaft 14 which can rotate about a rotational axis B1 which is disposed parallel to the rotational axis A1, a first intermediate shaft 15 which can rotate about a rotational axis C1 which is disposed parallel to the rotational axis A1, a second intermediate shaft 16 which can rotate about a rotational axis D1 which is disposed parallel to the rotational axis A1, and a reverse shaft 17 which can rotate about a rotational axis E1 which is disposed parallel to the rotational axis A1.

The first clutch 41 is provided at an end of the first main shaft 11 which faces the internal combustion engine 106, while the sun gear 32 of the planetary gear mechanism 30 and the rotor 72 of the electric motor 107 are mounted at an opposite end of the first main shaft 11 to the end which faces the internal combustion engine 106. Consequently, the first main shaft 11 is selectively connected to the crankshaft 6*a* of the internal combustion engine 106 by the first clutch 41 and is connected directly to the electric motor 107 so that power of the internal combustion engine 106 and/or the electric motor 107 is transmitted.

The second main shaft 12 is formed shorter than the first main shaft 11 and hollow and is disposed rotatably relative to the first main shaft 11 so as to cover the periphery of a portion of the first main shaft 11 which lies closer to the internal combustion engine 106. In addition, the second clutch 42 is provided at an end of the second main shaft 12 which faces the internal combustion engine 106 and an idle drive gear 27*a* is mounted integrally on the second main shaft 12 at an opposite end to the end which faces the internal combustion engine 106. Consequently, the second main shaft 12 is selectively connected to the crankshaft 6*a* of the internal combustion engine 106 by the second clutch 42 so that power of the internal combustion engine 106 is transmitted to the idle drive gear 27*a*.

The connecting shaft 13 is formed shorter than the first main shaft 11 and hollow and is disposed rotatably relative to the first main shaft 11 so as to cover the periphery of a portion of the first main shaft 11 which lies opposite to the internal combustion engine 106. In addition, a third speed drive gear 23*a* is rotated integrally on the connecting shaft 13 at an end which faces the internal combustion engine 106, and the carrier 36 of the planetary gear mechanism 30 is rotated integrally on the connecting shaft 13 at an end which lies opposite to the end which faces the internal combustion engine 106. Therefore, the carrier 36 provided on the connecting shaft 13 and the third speed drive gear 23*a* rotate integrally as the planetary gears 34 revolve.

Further, on the first main shaft 11, between a third speed drive gear 23*a* provide on the connecting shaft 13 and an idle drive gear 27*a* provided on the second main shaft 12, a seventh speed drive gear 97*a* and a fifth speed drive gear 25*a* constituting an odd-numbered gear change portion together with the third speed drive gear 23*a* are provided in this order from the third speed drive gear 23*a* so as to be rotatable relative to the first main shaft 11. In addition, between the fifth speed drive gear 25*a* and the idle drive gear 27*a*, a reverse driven gear 28*b* rotating integrally with the first main shaft 11 is provided.

Between the third speed drive gear 23*a* and the seventh speed drive gear 97*a*, a first odd-numbered gear change shifter 51A is provided to connect or disconnect between the first main shaft 11 and the third speed drive gear 23*a* or the seventh speed drive gear 97*a*. Between the seventh speed drive gear 97*a* and the fifth speed drive gear 25*a*, a second odd-numbered gear change shifter 51B is provided to connect or disconnect between the first main shaft 11 and the fifth speed drive gear 25*a*.

When the first odd-numbered gear change shifter 51A is in an in-gear state at a third speed connection position, the first main shaft 11 and the third speed drive gear 23*a* are coupled and rotated together. When the first odd-numbered gear change shifter 51A is in an in-gear state at a seventh speed connection position, the first main shaft 11 and the seventh speed drive gear 97*a* are coupled and rotated together. Further, the first odd-numbered gear change shifter 51A is in a neutral position, the first main shaft 11 rotates relative to the third speed drive gear 23*a* and the seventh speed drive gear 97*a*. When the first main shaft 11 and the third speed drive gear 23*a* rotate together, the sun gear 32 provided on the first main shaft 11 and a carrier 36 connected to the third speed drive gear 23*a* by the connecting shaft 13 integrally rotate, while a ring gear 35 also rotates together, and the planetary gear mechanism 30 is integrated.

When the second odd-numbered gear change shifter 51B is in an in-gear state, the first main shaft 11 and the fifth speed drive gear 25*a* are coupled and rotated together. When the second odd-numbered gear change shifter 51B is in a neutral position, the first main shaft 16 rotates relative to the fifth speed drive gear 25*a*.

A first idle driven gear 27*b*, which is adapted to mesh with the idle drive gear 27*a* which is provided on the second main shaft 12, is provided integrally on the first intermediate shaft 15.

A second idle driven gear 27*c* meshing with the first idle driven gear 27*b* provided on the first intermediate shaft 15 is provided on the second intermediate shaft 16 so as to rotate integrally with the second intermediate shaft 16. The second idle driven gear 27*c* constitutes a first idle gear set 27A together with the idle drive gear 27*a* and the first idle driven gear 27*b* described above, and the power of the internal combustion engine 106 is transmitted to the second intermediate shaft 16 from the second main shaft 12 via the first idle gear set 27A.

Further, on the second intermediate shaft 16, a second speed drive gear 22*a*, a sixth speed drive gear 96*a*, and a fourth speed drive gear 24*a* which constitute an even-numbered gear change portion are provided at positions corresponding to the third speed drive gear 23*a*, the seventh speed drive gear 97*a*, and the fifth speed drive gear 25*a* respectively provided on the first main shaft 11 so as to be rotatable relative to the second intermediate shaft 16.

A first even-numbered gear change shifter 52A is provided between the second speed drive gear 22*a* and the sixth speed drive gear 96*a* to connect or disconnect between the second intermediate shaft 16 and the second speed drive gear 22*a* or the sixth speed drive gear 96*a*. Between the sixth speed drive gear 96*a* and the fourth speed drive gear 24*a*, a second even-numbered gear change shifter 52B is provided to connect or disconnect between the second intermediate shaft 16 and the fourth speed drive gear 24*a*.

When the first even-numbered gear change shifter 52A is in an in-gear state at a second speed connection position, the second intermediate shaft 16 and the second speed drive gear 22*a* are coupled and rotated together. When the first even-numbered gear change shifter 52A is in an in-gear state at a sixth speed connection position, the second intermediate shaft 16 and the sixth speed drive gear 96*a* are coupled and rotated together. Further, the first even-numbered gear change shifter 52A is in a neutral position, the second intermediate shaft 16 rotates relative to the second speed drive gear 22*a* and the sixth speed drive gear 96*a*.

When the second even-numbered gear change shifter 52B is in an in-gear state, the second intermediate shaft 16 and the fourth speed drive gear 24*a* are coupled and rotated together. When the second even-numbered gear change shifter 52B is in a neutral position, the second intermediate shaft 16 rotates relative to the fourth speed drive gear 24*a*.

A first common driven gear 23*b*, a second common driven gear 96*b*, a third common driven gear 24*b*, a parking gear 21, and a final gear 26*a* are provided on the counter shaft 14 so as to be integrally rotatable in that order from a side opposite to the internal combustion engine 106.

Here, the first common driven gear 23*b* meshes with the third speed drive gear 23*a* provided on the connecting shaft 13 to constitute a third speed gear 23 together with the third speed drive gear 23*a*, and meshes with the second speed drive gear 22*a* provided on the second intermediate shaft 16 to constitute a second speed gear 22 together with the second speed drive gear 22*a*.

The second common driven gear 96*b* meshes with the seventh speed drive gear 97*a* provided on the first main shaft 11 to constitute a seventh speed gear 97 together with the seventh speed drive gear 97*a*, and meshes with the sixth speed drive gear 96*a* provided on the second intermediate shaft 16 to constitute a sixth speed gear 96 together with the sixth speed drive gear 96*a*.

The third common driven gear 24*b* meshes with the fifth speed drive gear 25*a* provided on the first main shaft 11 to constitute a fifth speed gear 25 together with the fifth speed drive gear 25*a*, and meshes with the fourth speed drive gear 24*a* provided on the second intermediate shaft 16 to constitute a fourth speed gear 24 together with the fourth speed drive gear 24*a*.

The final gear 26*a* meshes with the differential gear 8*f*, and the differential gear 8*f* is coupled to the driving wheels DWf and DWf via the driving axles 9*f* and 9*f*. Therefore, the power transmitted to the counter shaft 14 is output from the final gear 26*a* to the differential gear 8*f*, the driving axles 9*f* and 9*f*, and the driving wheels DWf and DWf.

A third idle driven gear 27*d* meshing with the first idle driven gear 27*b* provided on the first intermediate shaft 15 is provided integrally on the reverse shaft 17 so as to be rotatable. The third idle driven gear 27*d* constitutes a second idle gear set 27B together with the idle drive gear 27*a* and the first idle driven gear 27*b* which are described above, and the power of the internal combustion engine 106 is transmitted from the second main shaft 12 to the reverse shaft 17 via the second idle gear set 27B. In addition, a reverse drive gear 28*a* meshing with the reverse driven gear 28*b* provided on the first main shaft 11 is provided on the reverse shaft 17 so as to be rotatable relative to the reverse shaft 17. The reverse drive gear 28*a* constitutes a reverse gear set 28 together with the reverse driven gear 28*b*. Further, a reverse shifter 53 adapted to connect the reverse shaft 17 with the reverse drive gear 28*a* or release the connection of the shaft with the drive gear, is provided on an opposite side of the reverse drive gear 28*a* to a side opposite to the internal combustion engine 106.

When the reverse shifter 53 is in an in-gear state at a reverse connection position, the reverse shaft 17 and the reverse drive gear 28*a* rotate together. When the reverse shifter 53 is in a neutral position, the reverse shaft 17 rotates relative to the reverse drive gear 28*a*.

The first and second odd-numbered gear change shifters 51A and 51B, the first and second even-numbered gear change shifters 52A and 52B, and the reverse shifter 53 utilize a clutch mechanism having a synchromesh mechanism which makes rotational speeds of the shaft and the gear which are connected together coincide with each other.

In the transmission 210 which is configured as has been described heretofore, an odd-numbered gear change portion which is made up of the third speed drive gear 23*a*, the seventh speed drive gear 97*a*, and the fifth speed drive gear 25*a* is provided on the first main shaft 11 which is one transmission shaft of the two transmission shafts, while an even-numbered gear change portion which is made up of the second speed drive gear 22*a*, the sixth speed drive gear 96*a*, and the fourth speed drive gear 24a is provided on the second intermediate shaft 16 which is the other transmission shaft of the two transmission shafts.

In the twin-clutch type transmission 210 illustrated in FIG. 8, the odd-numbered gear change portions are provided on the shaft side to which the power of the internal combustion engine 106 and/or the electric motor 107 can be input by the locking of the first clutch 41, and the even-numbered gear change portions are provided on the shaft sides to which the power of the internal combustion engine 106 by the locking of the second clutch 42. However, the twin-clutch type transmission 210 may have a structure in which a relation between an odd-numbered stage and the even-numbered stage are reversed.

What is claimed is:

1. A control device for a transport vehicle configured to travel with a driving force output from an electric motor, wherein:
when the transport vehicle is driven by a driving force of the electric motor, the control device performs a driving force limit control to reduce the driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more;
the control device compares an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state; and
when the absolute value of the total driving force is smaller than the riding-over driving force and the conditions are satisfied, the control device performs the driving force limit control.

2. The control device according to claim 1, wherein
when the transport vehicle is driven by the driving force of the electric motor, the control device performs the driving force limit control in a case of satisfying conditions that the parameter relating to the traveling speed of the transport vehicle is less than the first threshold value, a torque required for the electric motor is equal to or larger than a second threshold value, and a state in which the parameter is less than the first threshold value and the required torque is equal to or larger than the second threshold value continues for the predetermined time or more.

3. The control device according to claim 1, wherein:
the electric motor is a polyphase electric motor; and
the first threshold value is an upper limit value at which a load is capable of concentrating on one phase in the electric motor or an electric device for driving the electric motor.

4. The control device according to claim 1, wherein
when an accelerator pedal opening of the transport vehicle is equal to or larger than a third threshold value, the driving force limit control is not performed even when the conditions are satisfied.

5. The control device according to claim 4, wherein
the third threshold value is a maximum value of the accelerator pedal opening in the transport vehicle.

6. A control device for a transport vehicle configured to travel with a driving force output from an electric motor, wherein:
when the transport vehicle is driven by a driving force of the electric motor, the control device performs a driving force limit control to reduce the driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more;
the transport vehicle includes a driving source for driving the transport vehicle;
the control device compares an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state; and
when the absolute value of the total driving force is larger than the riding-over driving force and the conditions are satisfied, the control device performs the driving force limit control and a driving force enlargement control to enlarge a driving force of the driving source.

7. The control device according to claim 6, wherein
an increment in the driving force of the driving source due to the driving force enlargement control is equal to a difference between the absolute value of the total driving force and the riding-over driving force.

8. The control device according to claim 6, wherein:
the electric motor drives one driving axle of the transport vehicle; and
the driving source drives the other driving axle of the transport vehicle.

9. A control method of a transport vehicle configured to travel with a driving force output from an electric motor, the control method comprising:
performing a driving force limit control to reduce a driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more when the transport vehicle is driven by the driving force of the electric motor;
comparing an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state; and
performing the driving force limit control when the absolute value of the total driving force is smaller than the riding-over driving force and the conditions are satisfied.

10. The control method according to claim 9, wherein the driving force limit control is performed in a case of satisfying conditions that the parameter relating to the traveling speed of the transport vehicle is less than the first threshold value, a torque required for the electric motor is equal to or larger than a second threshold value, and a state in which the parameter is less than the first threshold value and the required torque is equal to or larger than the second threshold value continues for the predetermined time or more when the transport vehicle is driven by the driving force of the electric motor.

11. The control method according to claim 9, wherein:
the electric motor is a polyphase electric motor; and
the first threshold value is an upper limit value at which a load is capable of concentrating on one phase in the electric motor or an electric device for driving the electric motor.

12. The control method according to claim 9, wherein when an accelerator pedal opening of the transport vehicle is equal to or larger than a third threshold value, the driving force limit control is not performed even when the conditions are satisfied.

13. The control method according to claim 12, wherein the third threshold value is a maximum value of the accelerator pedal opening in the transport vehicle.

14. A control method of a transport vehicle configured to travel with a driving force output from an electric motor, the control method comprising:
performing a driving force limit control to reduce a driving force of the electric motor based on a coefficient of static friction of the transport vehicle in a case of satisfying conditions that a parameter relating to a traveling speed of the transport vehicle is less than a first threshold value and a state in which the parameter is less than the first threshold value continues for a predetermined time or more when the transport vehicle is driven by the driving force of the electric motor;
the transport vehicle includes a driving source for driving the transport vehicle;
comparing an absolute value of a total driving force, which is a sum of a driving force of the electric motor after reduction due to the driving force limit control and a force derived from a gravitational force and acting on the transport vehicle, with a riding-over driving force, which is based on the coefficient of static friction of the transport vehicle and is a driving force acting on the transport vehicle when the transport vehicle being not braked moves from a stopped state; and
performing the driving force limit control and a driving force enlargement control to enlarge a driving force of the driving source when the absolute value of the total driving force is larger than the riding-over driving force and the conditions are satisfied.

15. The control method according to claim 14, wherein an increment in the driving force of the driving source due to the driving force enlargement control is equal to a difference between the absolute value of the total driving force and the riding-over driving force.

16. The control method according to claim 14, further comprising:
driving one driving axle of the transport vehicle by the electric motor; and
driving the other driving axle of the transport vehicle by the driving source.

* * * * *